3,108,967
LUBRICATING OIL COMPOSITION OF IMPROVED VISCOSITY INDEX AND DISPERSANCY
Frederick E. Bailey, Jr., Charleston, W. Va., assignor to Union Carbide Corporation, a corporation of New York
No Drawing. Filed Dec. 16, 1960, Ser. No. 76,129
8 Claims. (Cl. 252—51.5)

This invention relates to new and improved additives for lubricating oils which act as viscosity index improvers and dispersants.

The discosity index of a lubricating oil is a numerical rating which indicates the effect of a change of temperature on the viscosity of oil. A large viscosity index signifies a relatively small change of viscosity with temperature while a low viscosity index denotes a high change of viscosity with temperature. The viscosity index may be determined by the standard A.S.T.M. method.

It is desirable that lubricating oils should possess little variation in viscosity over relatively wide temperature ranges. However, most lubricating oils do not have good viscosity temperature characteristics and, therefore, have a tendency to thicken at low temperatures and to thin out at high temperatures. This results in sluggish circulation of the oil at low temperatures, causing increased fuel consumption and wear of the moving engine parts, and inadequate lubrication of these parts at high temperatures.

Moreover, in the usual type of low temperature stop-and-go city driving, the crankcase lubricating oil is subjected to considerable contamination from the combustion chambers, resulting, when ordinary lubricating oils are used, in the formation of sludge and other deposits in the crankcase and on many of the moving parts of the engine. It is, therefore, desirable that the lubricating oil contain some oil-soluble surface active agent which will act as a dispersant for the lubricating oil and will prevent sludge formation and promote engine cleanliness.

It has heretofore been known to add viscosity index improvers to lubricating oils. Examples of such materials are hydrocarbon polymers such as polybutenes and polymers containing alkyl and aryl radicals, condensation products of chlorinated wax with naphthalenes or copolymers of styrene with olefins; also, oxygen-containing polymers such as polymeric acrylic acid esters and polymers of vinyl esters such as polyoctylmethacrylate or a copolymer of vinyl stearate and vinyl laurate.

In order to improve the effectiveness of such additives, it has been common to combine the viscosity index improvers with dispersing agents such as soaps. However, this technique is objectionable since large amounts of the dispersant are usually required and the stability of the oil composition is usually adversely affected. Moreover, when the added dispersant is a soap, undesired foaming occurs.

It is an object of this invention to provide a single compound for addition to lubricating oil compositions which has the combined features of being a viscosity index improver and an excellent dispersant.

The object of this invention is accomplished by adding to a lubricating oil composition a copolymer of cyanoethyl acrylate with an alkyl acrylate containing from eight to fourteen carbon atoms in the alkyl radical. The alkyl radical of the alkyl acrylate monomer may be n-octyl, isooctyl, 2-ethylhexyl, nonyl, n-decyl, isodecyl, $C_{10}$ alkyl of the oxo alcohol from tripropylene (which is preferred), undecyl, lauryl, $C_{13}$ alkyl of oxo alcohols from tetrapropylene or triisobutylene, and the like.

The novel lubricating oil additives of this invention may be prepared by methods well known in the art. Thus, the cyanoethyl acrylate monomer may be copolymerized with the other acrylate monomer in emulsion, suspension, solvent solution or bulk. For the sake of speed, it is advantageous to use a polymerization catalyst. Suitable catalysts include the free radical generating catalysts, such as peroxides, for example, hydrogen peroxide; benzoyl peroxide; lauroyl peroxide; tertiary butyl hydroperoxide; 2,2-bis(tertiary butyl peroxy) butane; di(tertiary butyl) peroxide; diacetyl peroxide; tertiary butyl pelargonate; peracetic acid. Other suitable catalysts include diisopropylperoxydicarbonate and azo compounds, such as alpha, alpha' azobisisobutyronitrile. The amount of catalyst used is not crditical. Generally, from about 0.02 percent to 2 percent by weight of the material being polymerized is used.

The polymerization may be conducted at any suitable temperature. It has been found that a temperature of about 50° C. is particularly satisfactory.

The polymerization may be conducted in the presence or absence of air. It has been found advantageous to polymerize in the absence of air, however, e.g., in the presence of an inert atmosphere such as nitrogen. Atmospheric, reduced or superatmospheric pressure may be employed.

After the polymerization is complete, any unreacted monomer may be removed by distillation or by precipitation of the copolymer.

The amount of each monomer in the copolymer should be controlled within rather narrow limits in order to give the optimum beneficial results. Thus, the cyanoethyl acrylate should comprise from about 2 percent to about 10 percent and preferably from about 5 percent to 7 percent based on the total weight of both monomers in the copolymer.

The molecular weight of the copolymer may vary from about 5,000 to about 100,000. A convenient measure of molecular weight of the copolymer is by reference to the reduced viscosity ($I_R$) of the polymer. The reduced viscosity of a particular polymer is given by the formula $I_R = I_S/C$, where $I_S$ is the specific viscosity and $C$ is the concentration of the polymer in the solvent in grams per 100 milliliter solvent. The specific viscosity $I_S$ is given by the formula $$I_S = \frac{V_2 - V_1}{V_1}$$

where $V_2$ is the viscosity of the solution and $V_1$ is the viscosity of the pure solvent. Reduced viscosities were determined on solutions of 0.2 gram of polymer in 100 milliliters of benzene at 30° C. The reduced viscosities of the copolymer additives of this invention in benzene are preferably in the range of from about 0.50 to about 1.50.

The following examples indicate the preparation of suitable copolymers and their evaluation as oil additives:

EXAMPLE 1

A 1.6 gallon glass-lined, stirred autoclave was flushed with nitrogen and charged with:

2650 milliliters of heptane,
1140 grams of isodecyl acrylate (oxo isodecanol from tripropylene), and
60 grams of 2-cyanoethyl acrylate.

After purging the solution for 5 minutes with nitrogen, 48 milliliters of diacetyl peroxide (25 percent solution in dimethyl phthalate) was added. A temperature of 50° C. was maintained throughout the polymerization. After 12.83 hours, the product was dumped and samples worked up for total solids, reduced viscosity and nitrogen analysis. Total solids showed 81.6 percent conversion, analysis showed 5.36 percent 2-cyanoethyl acrylate in the copolymer and a reduced viscosity of 1.02 was determined (0.2 gram resin/100 milliliters benzene at 30° C.).

The various copolymers to be tested as viscosity index improvers-dispersant additives to lubricating oils were put into oil solution as concentrates in Gulf Security Oil 44. The concentrates were prepared by dissolving the resin in benzene, adding the solution to the oil and stripping free of benzene. These concentrates were used to prepare solutions for the evaluations.

After the concentrate was added to the oil, the composition was tested to determine its viscosity index by the standard A.S.T.M. method.

Table I shows the results of tests on the viscosity index improvement properties in Gulf Security Oil 44 (GSO 44) and DX Sunray base oil blend (DX), using copolymers of 2-cyanoethyl acrylate and isodecyl acrylate as the additive. The copolymers were prepared by the same method as set out in Example 1, supra. Gulf Security Oil 44 is a petroleum lubricating oil available from the Gulf Oil Company. The DX Sunray Blend was 60 percent DX Sunray 150 neutral and 40 percent DX Sunray 400 neutral. The blend was made up to a 220 SUS base oil. The petroleum lubricating oil components of the blend are commercially available from DX Sunray.

when added to any hydrocarbon lubricating oil. Best results are obtained when the copolymers preferably comprise about 1 to 3 percent of the oil composition and generally about 0.5 to 4 percent of the oil composition.

Since it is often desirable for oil formulations to exhibit pour point depressant properties, the concentrates of lubricating oil and copolymer additives were mixed with commercial pour point depressants to determine their compatibility.

Mixtures of the 5 percent 2-cyanoethyl acrylate-95 percent decyl acrylate concentrate with a minor amount of pour point depressant, "Paraflow 46X," showed no sign of separation during 50 days' storage at room temperature. One of them remained stable for 50 days at alternating temperature conditions. A concentrate of a low molecular weight (reduced viscosity=0.095) polymer of an ester of "Adol" 13 alcohol and methacrylic acid also remained stable with this dispersant.

These concentrates are solutions in oil containing 30 percent by weight of polymer and 6 percent of pour point depressant. "Paraflow 46X" is a commercial proprietary pour point depressant of the chlorinated parafinnaphthalene condensate type. "Adol" 13 is a commercial, straight chain (cocoanut alcohol) mixture. It has the following composition.

*Table I*

2-CYANOETHYL ACRYLATE/ISODECYL ACRYLATE COPOLYMERS

| Ex. | Percent Cyanoethyl Acrylate in Copolymer | Reduced Viscosity in Benzene | Percent Resin in Oil | GSO 44 | | | DX Sunray | | |
|---|---|---|---|---|---|---|---|---|---|
| | | | | Vis., Cs. | | Viscosity Index | Vis., Cs. | | Viscosity Index |
| | | | | 100° F. | 210° F. | | 100° F. | 210° F. | |
| 2 | 5.0 | 0.77 | 2.0 | 53.70 | 9.34 | 142.5 | | | |
| 3 | 5.0 | 0.77 | 0.75 | | | | 54.50 | 8.13 | 123 |
| 4 | 5.0 | 0.93 | 2.0 | | | | 73.13 | 11.97 | 140.5 |
| 5 | 5.0 | 0.94 | 0.75 | | | | 53.59 | 8.07 | 124.0 |
| 6 | 5.0 | 0.96 | 2.0 | | | | 66.14 | 10.96 | 140.5 |
| 7 | 5.0 | 1.01 | 0.75 | | | | 54.25 | 8.22 | 125.5 |
| 8 | 5.0 | 1.09 | 0.75 | | | | 55.36 | 8.38 | 126.5 |
| 9 | 5.0 | 1.31 | 2.0 | | | | Insoluble | | |
| 10 | 5.0 | 1.47 | 0.75 | | | | 57.20 | 9.00 | 133.0 |
| 11 | 7.0 | 0.83 | 2.0 | 50.36 | 9.10 | 145.5 | | | |
| 12 | 7.0 | 0.94 | 2.0 | 51.25 | 9.49 | 147.5 | | | |
| 13 | 7.0 | 0.99 | 0.5 | 37.89 | 6.34 | 125.5 | | | |
| 14 | 7.0 | 1.23 | 0.5 | 38.44 | 6.60 | 131.5 | | | |
| 15 | 10.0 | 0.78 | 2.0 | Insoluble | | | | | |

The copolymers used in Examples 2 to 15 were further tested to determine their suitability as dispersants.

Dispersency properties were determined using a carbon dispersion or suspension test. In this test, 3 grams of carbon paste consisting of 20 percent by weight of carbon black and 80 percent by weight of mineral oil were dispersed in 70 milliliters (57 grams) of kerosene, which contained the desired amount of dispersant copolymer additive, by mixing for 3 minutes in a high speed mixer. The mixture was then transferred to a 50-milliliter cylinder and the carbon settling rate observed over a period of 72 hours. If the carbon remained suspended (no clear top layer), the additive was considered to be a satisfactory dispersant. Since water is a common contaminant in crankcase oils and sometimes negates the effectiveness of the dispersant, this test was also carried out with small amounts of water present in the mixture.

By these tests, it was determined that the copolymers used in Examples 2 to 15 were at least as effective as commercial ashless dispersants, such as Acryloid 966 of Rohm and Haas and LOA 564 of Du Pont. These are commercial proprietary viscosity index improver-dispersants presumed to be of the polymeric methacrylate type.

Although the examples illustrate the addition of the copolymers to Gulf Security Oil 44 and DX Sunray base oil, the novel additives of this invention are effective Alcohol: Weight percent
Octanol, $C_8$ — 0.3
Capryl, $C_{10}$ — 4.4
Lauryl, $C_{12}$ — 53.8
Myristyl, $C_{14}$ — 25.0
Cetyl, $C_{16}$ — 11.1
Stearyl, $C_{18}$ — 5.4

What is claimed is:

1. A lubricating oil composition consisting essentially of from about 96 to 99.5 percent by weight of a hydrocarbon lubricating oil and about 0.5 to 4 percent by weight of a copolymer of cyanoethyl acrylate with decyl acrylate, said copolymer having a reduced viscosity in benzene of from about 0.50 to about 1.50 and containing from about 2 to about 10 percent of cyanoethyl acrylate.

2. A lubricating oil composition consisting essentially of from about 98 to 99.5 percent by weight of a hydrocarbon lubricating oil and about 0.5 to 2 percent by weight of a copolymer of 2-cyanoethyl acrylate and decyl acrylate, said copolymer containing from about 5 to 7 percent by weight of 2-cyanoethyl acrylate and said copolymer having a reduced viscosity in benzene from about 0.77 to about 1.47.

3. A lubricating oil composition consisting essentially of a hydrocarbon lubricating oil and in an amount sufficient to serve as a viscosity index improver and dispersant therefor, a copolymer of cyanoethyl acrylate and an alkyl acrylate containing from 8 to 14 carbon atoms in the alkyl radical, said copolymer containing from about 2 percent to about 10 percent by weight cyanoethyl acrylate and having a reduced viscosity in benzene of from about 0.50 to about 1.50.

4. A lubricating oil composition as defined in claim 3 wherein said copolymer is present in said composition in an amount of about 1 percent to 3 percent by weight.

5. A lubricating oil composition as defined in claim 3 wherein said cyanoethyl acrylate is 2-cyanoethyl acrylate.

6. A lubricating oil composition consisting essentially of a hydrocarbon lubricating oil and in an amount sufficient to serve as a viscosity index improver and dispersant therefor, a copolymer of cyanoethyl acrylate and an alkyl acrylate containing from 8 to 14 carbon atoms in the alkyl radical, said copolymer containing from about 5 percent to 7 percent by weight cyanoethyl acrylate and having a reduced viscosity in benzene of from about 0.50 to about 1.50.

7. A lubricating oil composition as defined in claim 6 wherein said copolymer is present in said composition in an amount of about 1 percent to 3 percent by weight.

8. A lubricating oil composition as defined in claim 6 wherein said cyanoethyl acrylate is 2-cyanoethyl acrylate.

References Cited in the file of this patent

UNITED STATES PATENTS

| | | |
|---|---|---|
| 2,379,297 | Harmon et al. | June 26, 1945 |
| 2,653,133 | Catlin | Sept. 22, 1953 |
| 2,839,512 | Barnum et al. | June 17, 1958 |
| 2,892,793 | Stewart et al. | June 30, 1959 |

FOREIGN PATENTS

| | | |
|---|---|---|
| 760,554 | Great Britain | Oct. 31, 1956 |